March 19, 1968  R. J. PURTELL  3,373,936
IRRIGATION SYSTEMS
Filed Nov. 26, 1965  2 Sheets-Sheet 1
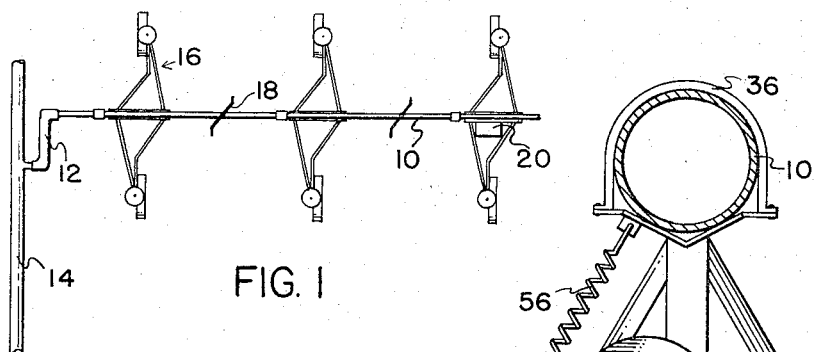
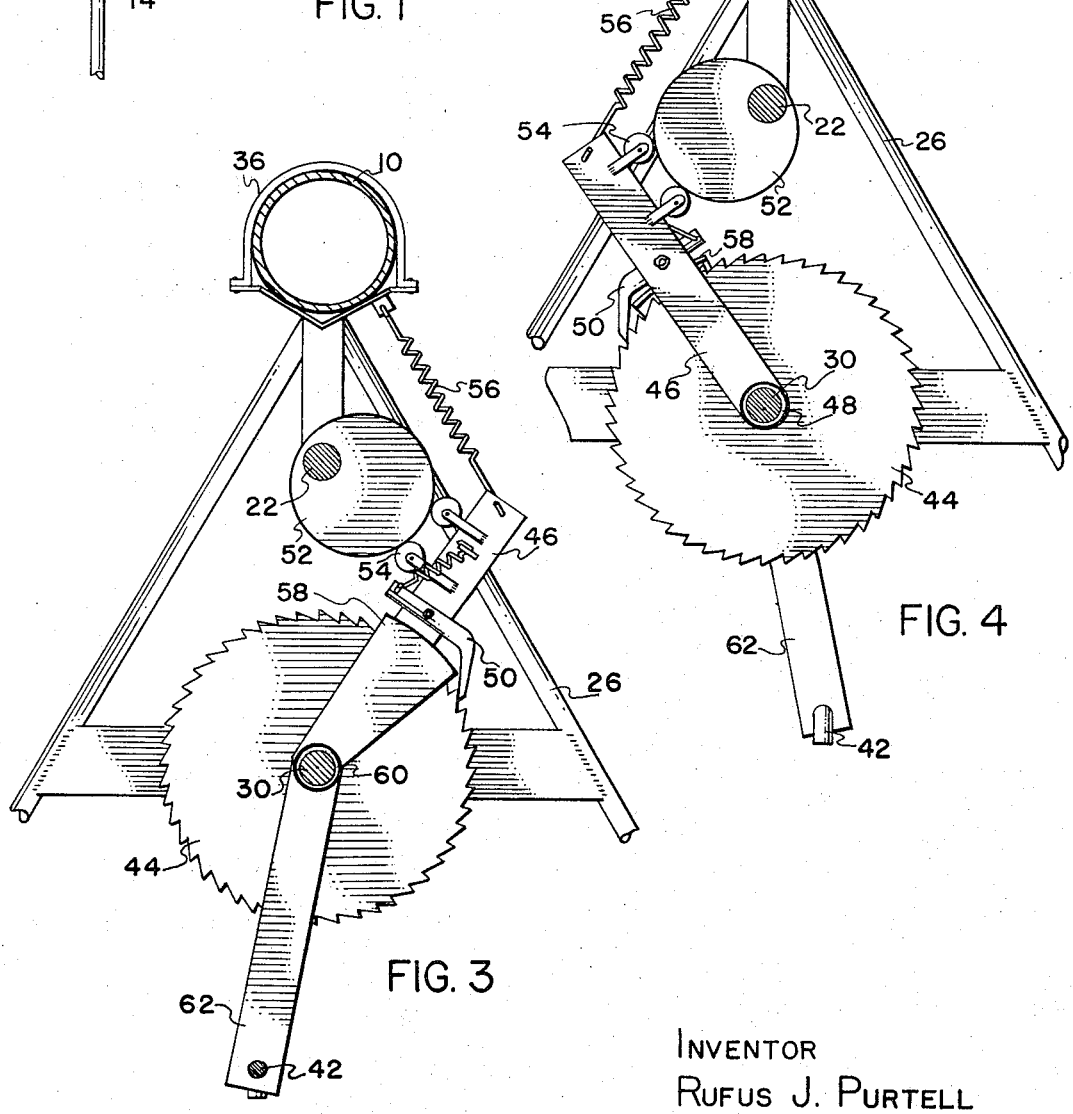
INVENTOR
RUFUS J. PURTELL

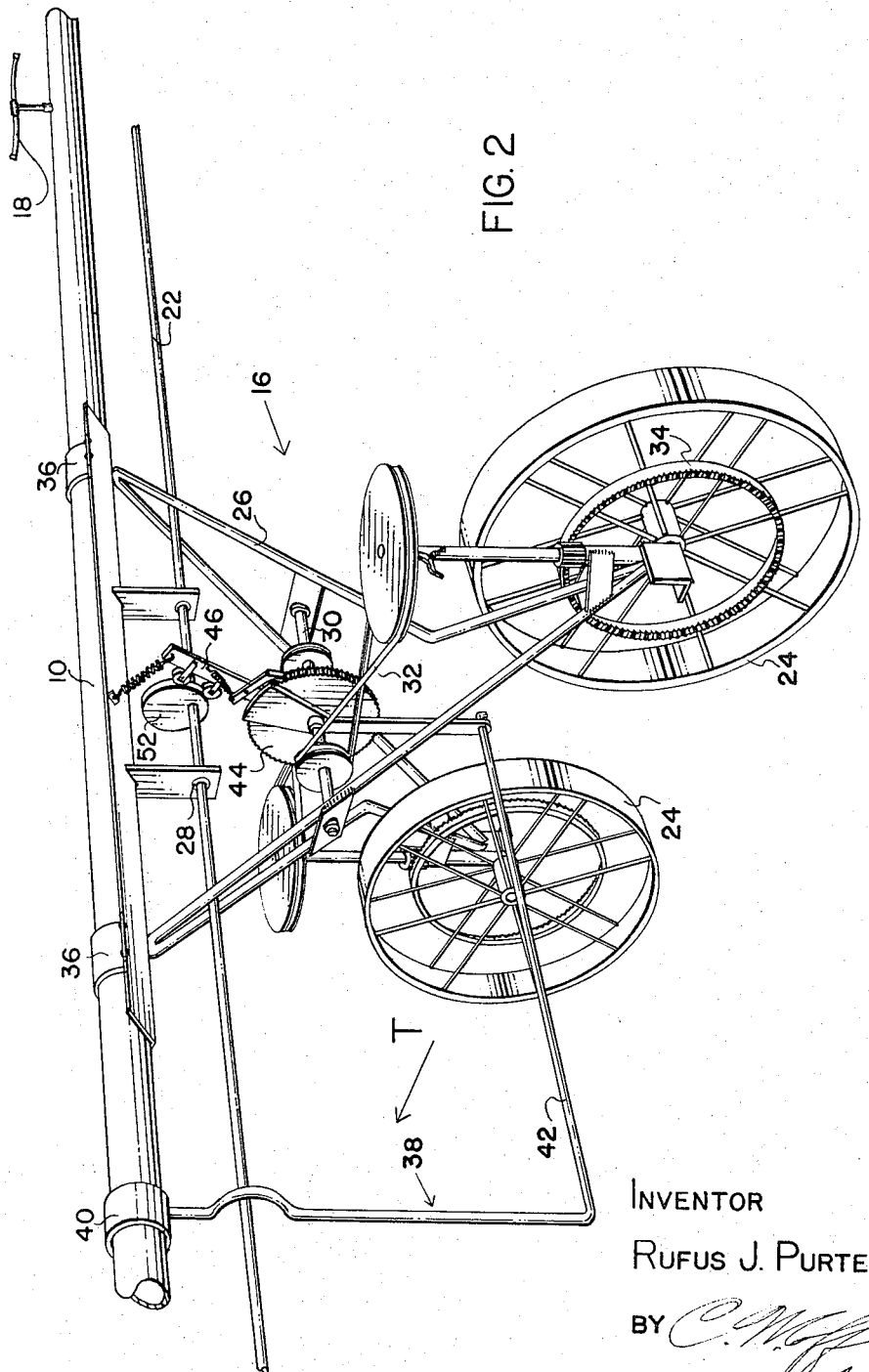

United States Patent Office 3,373,936
Patented Mar. 19, 1968

3,373,936
IRRIGATION SYSTEMS
Rufus J. Purtell, Brownfield, Tex., assignor to The J. B. Knight Co. Inc., Brownfield, Tex., a corporation of Texas
Continuation-in-part of applications Ser. No. 26,636, Apr. 19, 1960, and Ser. No. 338,768, Jan. 20, 1964. This application Nov. 26, 1965, Ser. No. 509,900
13 Claims. (Cl. 239—1)

ABSTRACT OF THE DISCLOSURE

In an irrigation system, misalignment of a pipe supported by vehicles is detected by a stiff leg attached to the pipe. Upon misalignment the stiff leg moves a shield between a ratchet and dog, thus inactivating the drive to the vehicles.

---

This application is a continuation-in-part of my prior applications listed below inasmuch as it discloses and claims subject matter disclosed in the earlier applications: Ser. No. 26,636, filed April 19, 1960, Patent No. 3,220,654, issue date November 30, 1965; Ser. No. 338,768, filed January 20, 1964, Patent No. 3,245,595, issue date April 12, 1966.

This invention relates to agricultural irrigation and more particularly to keeping a plurality of vehicles which support a sprinkler pipe in alignment as they move the sprinkler pipe.

In agricultural irrigation, much of the land is watered by sprinkling water from pipes which are moved by vehicles. One of the problems existing in such a system is maintained all of the vehicles attached to the pipe in alignment. This invention solves that problem by driving the wheels by a ratchet drive and inactivating the ratchet to a particular vehicle if it is found desirable to drive that vehicle at less than full speed.

An object of this invention is to provide a means for maintaining a plurality of vehicles in alignment.

Further objects are to achieve the above with a device that is sturdy, compact, durable, simple, safe, versatile, and reliable, yet inexpensive and easy to manufacture and operate.

Still further objects are to achieve the above with a method that is inexpensive and does not require skilled people to adjust and operate.

The specific nature of the invention, as well as other objects, uses, and advantages thereof, will clearly appear from the following description and from the accompanying drawing, the different views of which are not necessarily to the same scale, in which:

FIG. 1 is a plan view somewhat schematic showing the general layout of a system according to this invention.

FIG. 2 is a perspective view of one vehicle with the pipe attached to it, illustrating the invention.

FIG. 3 is a partial sectional view showing the details of the mechanism according to this invention.

FIG. 4 is a partial sectional view illustrating the reverse side of the same mechanism illustrated in FIG. 3.

Referring more particularly to the drawing, it may be seen that elongated pipe 10 is attached by a flexible hose 12 to main pipe 14. The main pipe 14 is a source of supply of water or means for supplying water under pressure to the pipe 10. Pipe 10 is movingly supported by a plurality of vehicles 16. A plurality of sprinklers 18 are on the pipe for sprinkling water upon the land to be irrigated. Motor 20 in the form of an internal combustion engine is mounted upon one of the vehicles 16. It is mechanically connected to line shaft 22, which extends for the full length of the pipe 10 and is connected to each of the vehicles 16. The line shaft 22 is a drive means for transferring dynamic mechanical power to each of the vehicles. The motor 20 is power means for powering the drive shaft 22 by rotating same. Inasmuch as engines for shaft-powered vehicles are old in irrigation systems, the details of such are not discussed here.

Referring more particularly to FIG. 2, each vehicle 16 has two ground engaging wheels 24, which are attached to frame 26. The line shaft 22 is attached to each of the vehicles and, specifically, the line shaft is journaled for rotation by bearing 28 to the frame 26. Also, jack shaft 30 is journaled for rotation to each of the frames 26 parallel to the line shaft 22 which is also parallel to the pipe 10. The jack shaft 30 is rotated responsive to rotation of the line shaft 22 by mechanism which is described in greater detail later. The wheels 24 are rotated responsive to rotation of the jack shaft 30 through belts 32 and pinion gear and ring gear 34. Inasmuch as the specific drive means from the jack shaft 30 to the wheels 24 is not particularly related to this invention, it will not be described in detail here, reference being made to my patent application, Ser. No. 338,768, noted above, if further details are desired on this portion of the drive mechanism.

Pipe 10 is attached to the frame 26 by clamps 36. The pipe 10 is attached to the frame 26 so that, with the wheels 24 in the position shown, the pipe is moved at right angles or transverse to its axis. Stiff arm 38 is securely attached by clamp 40 to the pipe 10 adjacent to each of the vehicles 16. The stiff arm depends below the pipe 10 and extends by horizontal leg 42 to below the frame 26 and below the jack shaft 30.

If any one of the vehicles 16 is out of alignment with the other vehicles, the portion of the horizontal leg 42 below the jack shaft 30 will move relative to the jack shaft, e.g., if the vehicle illustrated as traveling in the direction of arrow T is ahead of the adjacent vehicle, the slight bend or flexure of the pipe 10 between clamp 36 and clamp 40 will cause the stiff arm or horizontal leg 42 to move forward with respect to the jack shaft 30. If this vehicle is forward, it is desired that it should be driven at less than full speed. Thus, I have provided a means for detecting misalignment or a means for detecting the desirability of driving the vehicle at less than full speed.

Ratchet wheel 44 is securely attached to jack shaft 30. Ratchet arm 46 is pivoted to the jack shaft 30 inasmuch as the ratchet arm 46 is attached to sleeve 48 which surrounds the jack shaft 30 and the jack shaft 30 is rotatable within the sleeve 48. Spring-loaded pawl or ratchet dog 50 is pivoted to the ratchet arm 46 so that reciprocation or oscillation of the ratchet arm causes the rotation of the jack shaft 30 by the engagement of the dog 50 upon the teeth on the ratchet wheel 44. Eccentric or cam 52 is securely attached to line shaft 22 above the ratchet wheel 44. Cam followers 54 upon the ratchet arm 46 engage the cam 52. Spring 56 between the ratchet arm 46 and the frame 26 biases the ratchet arm toward the cam so that the cam followers 54 maintain contact with cam 52. Therefore, rotation of the line shaft 22 causes reciprocation or oscillation of ratchet arm 46 which through dog 50 rotates jack shaft 30.

It is noted as a point of interest that U.S. Patent Nos. 2,604,359 and 2,941,727 to Zybach each shows a ratchet drive and a means for detecting misalignment.

The above description is based upon no intervention by shield 58 which is described below. Thus, means carried on each vehicle 16 for driving the vehicle responsive to movement of the drive means or rotation of the line shaft 22 has been described.

The cylindrical shield 58 is pivoted to jack shaft 30 inasmuch as it is attached to sleeve 60 which surrounds the jack shaft 30 on the other side of the ratchet wheel 44 from the sleeve 48. The shield 58 is a segment of a cylinder of slightly greater diameter than the ratchet wheel 44 and, inasmuch as it is carried by the jack shaft 30, it is also co-axial with the ratchet wheel 44 and it surrounds and extends over a portion of the teeth on the ratchet wheel 44. Lever 62 is securely attached to the sleeve 60 and depends below it. The lever 62 is attached to the horizontal leg 42 of stiff arm 38. The parts are so proportioned that, if the vehicle 16 is ahead of the adjacent vehicles, the shield 58 will be rotated to come between the dog 50 and the teeth on ratchet wheel 44. The further the vehicle is ahead, the more the shield moves to "blank off" more of the teeth. As the vehicle falls behind with respect to adjacent vehicles, more of the ratchet teeth are exposed by the shield 58. Thus, not only may the vehicle 16 be driven slower or the drive partially inactivated if the vehicle moves forward, but also full activation or greater speed may be obtained if the vehicle falls behind the adjacent vehicles. Regardless of this refinement, means are provided for at least partially inactivating the means of driving the vehicle 16 from the line shaft 22. This means for inactivating is responsive to the stiff arm 38 or the means for detecting a desirability of driving the vehicle at less than full speed.

It will be apparent that the embodiment shown is only exemplary and that various modifications can be made in construction, materials, and arrangement within the scope of the invention as defined in the appended claims.

I claim as my invention:

1. In an irrigation system having
   (a) a pipe,
   (b) means for supplying water under pressure to said pipe,
   (c) said pipe adapted to carry sprinklers for sprinkling water from said pipe,
   (d) a plurality of vehicles movably supporting said pipe,
   (e) drive means extending along the pipe for transferring dynamic mechanical power to each vehicle,
   (f) power means attached to said drive means for powering said drive means,
   (g) means carried on each vehicle for driving the vehicle responsive to movement of said drive means, and
   (h) means operatively associated with each vehicle for detecting a desirability for driving that vehicle less than full speed;
   (j) the improved alignment system comprising in combination with the above:
   (k) means attached to each vehicle for at least partially inactivating the means for driving,
   (m) said means for inactivating responsive to said means for detecting.

2. The invention as defined in claim 1 wherein
   (n) said means carried on each vehicle for driving the vehicle includes:
      (i) a ratchet wheel,
      (ii) a dog engaging teeth of the ratchet wheel for rotating the ratchet wheel, and
      (iii) means for reciprocating the dog; and
   (o) said means for at least partially inactivating the means for driving includes means for disengaging the dog from the ratchet wheel.

3. The invention as defined in claim 2 wherein said means for disengaging includes:
   (p) a shield partially surrounding the ratchet wheel,
   (q) said shield having means for disengaging the dog from the ratchet wheel.

4. In an irrigation system having:
   (a) a pipe,
   (b) means for supplying water under pressure to said pipe,
   (c) said pipe adapted to carry sprinklers for sprinkling water from said pipe,
   (d) a plurality of vehicles movably supporting said pipe,
   (e) a line shaft extending along the pipe to all the vehicles,
   (f) power means carried by one vehicle for rotating the line shaft,
   (g) means carried on each vehicle for driving the vehicle responsive to rotation of the line shaft, and
   (h) means attached to the pipe adjacent to each vehicle for detecting misalignment of that vehicle;
   (j) the improved alignment system comprising in combination with the above:
   (k) means attached to each vehicle for at least partially inactivating the means for driving,
   (m) said means for inactivating responsive to said means for detecting,
   (n) said means carried on each vehicle for driving the vehicle includes:
      (i) a ratchet wheel,
      (ii) a dog engaging teeth of the ratchet wheel for rotating the ratchet wheel, and
      (iii) means for reciprocating the dog; and
   (o) said means for at least partially inactivating the means for driving includes means for disengaging the dog from the ratchet wheel.

5. The invention as defined in claim 4 wherein said means for disengaging includes
   (p) a shield partially surrounding the ratchet wheel,
   (q) said shield having means for disengaging the dog from the ratchet wheel.

6. In an irrigation system having:
   (a) a pipe;
   (b) means for supplying water under pressure to said pipe;
   (c) said pipe adapted to carry sprinklers for sprinkling water from said pipe;
   (d) a plurality of vehicles movably supporting said pipe;
   (e) means on each vehicle for driving that vehicle, including:
      (i) a ratchet wheel,
      (ii) a dog engaging teeth of the ratchet wheel for rotating the ratchet wheel, and
      (iii) means for reciprocating the dog; and
   (f) means operatively associated with each vehicle for detecting a desirability for driving that vehicle less than full speed;
   (g) the improved alignment system comprising in combination with the above:
   (h) means for disengaging the dog from the teeth on the ratchet wheel responsive to said means for detecting.

7. The invention as defined in claim 6 wherein said means for disengaging includes
   (j) a shield partially surrounding the ratchet wheel,
   (k) said shield having means for disengaging the dog from the ratchet wheel.

8. The invention as defined in claim 6 wherein said means for detecting includes:
   (j) a stiff arm rigidly attached to said pipe a spaced distance from the vehicle,
   (k) said arm including a horizontal leg extending beneath the pipe to the vehicle so that movement of the end of the horizontal leg forward relative to the vehicle indicates the vehicle is forward in its alignment with other vehicles and movement of the arm backwards relative to the vehicle indicates a vehicle is behind the other vehicles attached to said pipe.

9. In an irrigation system having
   (a) a pipe,
   (b) means for supplying water under pressure to said pipe,
   (c) said pipe adapted to carry sprinklers for sprinkling water from said pipe, (d) a plurality of vehicles movably supporting said pipe,
(e) a line shaft extending along the pipe to all the vehicles,
(f) power means carried by one vehicle for rotating the line shaft;
(g) the improvement comprising in combination with the above:
(h) a cam attached to the line shaft at each vehicle,
(j) a jack shaft journaled to each vehicle,
(k) a ratchet wheel on each jack shaft,
(m) a movable ratchet arm,
(n) a cam follower on each ratchet arm contacting the cam so that the ratchet arm is reciprocated responsive to rotation of said cam,
(o) a dog on each ratchet arm contacting the ratchet wheel for rotating the ratchet wheel responsive to reciprocation of the ratchet arm, and
(p) means on each vehicle for driving the vehicle responsive to rotation of the jack shaft.

10. The invention as defined in claim 9 with the addition of:
(q) means operatively associated with each vehicle for detecting misalignment of that vehicle, and
(r) means attached to each vehicle for at least partially disengaging the dog from the ratchet wheel responsive to said means for detecting.

11. The invention as defined in claim 10 wherein said means for disengaging includes
(s) a shield partially surrounding the ratchet wheel,
(t) said shield having means for disengaging the dog from the ratchet wheel.

12. In an irrigation pipe moving system having:
(a) an elongated pipe adapted to carry water under pressure, and
(b) a plurality of vehicles attached thereto to move the pipe transversely;
(c) the improved means for detecting if a vehicle is misaligned comprising in combination:
(d) a stiff arm rigidly attached to said pipe a spaced distance from the vehicle,
(e) said arm including a horizontal leg extending beneath the pipe to the vehicle so that movement of the end of the horizontal leg forward relative to the vehicle indicates the vehicle is forward in its alignment with other vehicles and movement of the arm backwards relative to the vehicle indicates a vehicle is behind the other vehicles attached to said pipe.

13. In an irrigation system having:
(a) a pipe,
(b) means for supplying water under pressure to said pipe,
(c) said pipe adapted to carry sprinklers for sprinkling water from said pipe,
(d) a plurality of vehicles movably supporting said pipe,
(e) drive means extending along the pipe for transferring dynamic mechanical power to each vehicle,
(f) power means attached to said drive means for powering said drive means, and
(g) means carried on each vehicle for driving the vehicle responsive to movement of said drive means,
(h) the method of maintaining the vehicles aligned comprising the following steps:
(j) detecting that it is desirable to drive one of said vehicles less than full speed, and
(k) at least partially inactivating the drive from the drive means to that vehicle responsive to detecting the desirability of driving less than full speed.

References Cited
UNITED STATES PATENTS

| | | | |
|---|---|---|---|
| 3,281,080 | 10/1966 | Hogg | 239—212 |
| 3,220,654 | 11/1965 | Purtell | 239—212 |
| 3,245,595 | 4/1966 | Purtell | 239—212 |
| 3,334,815 | 8/1967 | Hogg | 239—177 X |

M. HENSON WOOD, Jr., *Primary Examiner.*

M. Y. MAR, *Assistant Examiner.*